United States Patent [19]

Morikawa et al.

[11] Patent Number: 4,585,045

[45] Date of Patent: Apr. 29, 1986

[54] PNEUMATIC TIRE FOR PASSENGER CAR

[75] Inventors: Tuneo Morikawa; Kazuyuki Kabe, both of Hiratsuka, Japan

[73] Assignee: The Yokohama Rubber Co., Ltd., Tokyo, Japan

[21] Appl. No.: 604,513

[22] Filed: Apr. 27, 1984

[30] Foreign Application Priority Data

May 11, 1983 [JP] Japan ................................ 58-80947

[51] Int. Cl.$^4$ .......................... B60C 9/06; B60C 9/20; B60C 9/26
[52] U.S. Cl. ................................. 152/536; 152/550; 152/555; 152/557; 152/559; 152/526; 152/528
[58] Field of Search ........ 152/330 R, 354 R, 354 RB, 152/355, 356 R, 356 A, 357 R, 357 A, 359, 361 R, 361 FP, 361 DM, 526, 528, 536, 550, 555, 557, 559

[56]  References Cited

U.S. PATENT DOCUMENTS

| | | | |
|---|---|---|---|
| 3,160,192 | 12/1964 | Drew | 152/355 |
| 4,162,698 | 7/1979 | Merli et al. | 152/550 |
| 4,177,852 | 12/1979 | Merli et al. | 152/550 |
| 4,246,949 | 1/1981 | Kawasaki et al. | 152/550 |
| 4,469,157 | 9/1984 | Morikawa et al. | 152/354 R |

FOREIGN PATENT DOCUMENTS 0047204  3/1982  Japan .............................. 152/354 R

*Primary Examiner*—Lois E. Boland
*Attorney, Agent, or Firm*—Finnegan, Henderson, Farabow, Garrett & Dunner

[57]  ABSTRACT

In a pneumatic tire of the type which consists of a pair of right and left beads, a pair of right and left side walls continuing the beads, respectively, and a tread interposed between the side walls, and in which a carcass cord layer is spread between the beads, and at least two layers consisting of a belt reinforcing layer whose reinforcing cords have a cord angle of from 15° to 30° with respect to the circumferential direction of the tire and a belt reinforcing layer whose reinforcing cords have a cord angle of from 150° to 165° with respect to the tire circumferential direction, and laminated and disposed between the tread and the carcass cord layer, a pneumatic tire for a passenger car characterized in that the carcass cord layer has a two-layered laminate structure consisting of upper and lower carcass cord layers; the angle of the reinforcing cords constituting each of the carcass cord layers with respect to the tire circumferential direction, when measured from the side in which the angle of the reinforcing cords of the belt reinforcing layer on the contact side with the carcass cord layer describes an acute angle with respect to the tire circumferential direction, is such that the mean value $\frac{1}{2}(\alpha_1+\alpha_2)$ of the angle $\alpha_2$ of the reinforcing cords of the carcass cord on the contact side with the belt reinforcing layer and the angle $\alpha_1$ of the reinforcing cords of the carcass cord layer below the former is from 96° to 108° and their difference $(\alpha_2-\alpha_1)$ is from 10° to 40°; the upper carcass cord layer consists of polyester while the lower carcass cord layer consists of nylon; both ends of the upper carcass cord layer are extended from the ends of the belt reinforcing layers to the bead wires of the beads while both ends of the lower carcass cord layer are turned up from inside to outside by the bead wires; and the surface creep distance x of the upper carcass cord layer from the end of the belt reinforcing layer to the end thereof and the surface creep distance l of the lower carcass cord layer from the end of the belt reinforcing layer to the upper end of the bead wire satisfy the relation $x/l = 0.2 \sim 0.9$.

4 Claims, 12 Drawing Figures

PNEUMATIC TIRE FOR PASSENGER CAR

BACKGROUND OF THE INVENTION

This invention relates generally to a pneumatic tire, and more particularly to a pneumatic tire for a passenger car which reduces ply steer of the tire to improve straight driving performance and drastically improve running stability and drastically, durability in high speed running, and which is light in weight and economical.

A radial tire for a passenger car in accordance with the prior art generally has a construction in which a belt reinforcing layer consisting of at least two layers is interposed between a tread and a carcass cord layer. Reinforcing cords of one of these belt reinforcing layers have a cord angle of from 15° to 30° with respect to the circumferential direction of the tire while the reinforcing cords of the other have a cord angle of from 150° to 165° with respect to the tire circumferential direction, and these reinforcing cords cross one another. The carcass cord layer consists of one or two layers, and the cords of each layer are disposed at an angle of about 90° with respect to the tire circumferential direction. In comparison with a bias tire, the radial tire of this kind is more excellent in the aspects of brake performance, low fuel consumption and wear resistance due to the effect brought forth by the belt reinforcing layers, but has a problem in that running stability is lower due to the belt reinforcing layers. In other words, when the radial tire rotates and advances, a lateral force occurs either to the right or left to the advancing direction, even if a slip angle is zero, so that a car advances in a direction different from the direction in which the driver of the car wishes to drive the car.

Generally, the lateral force with the zero slip angle consists of force components resulting from two different mechanisms. One is called "conicity" (CT) with the other being called "ply steer" (PS), and they are classified as part of the uniformity characteristics of the tire. On the other hand, in accordance with a uniformity test method (JASO C607) for a car tire, the conicity CT and the ply steer PS are expressed by the following equation from their definition where LFD represents the mean value of the lateral force when the tire rotates once, LFDw represents the value when measured on the face and LFDs represents the value when measured on the reverse by changing the position of the tire:

$$LFDw = PS + CT \quad (1)$$

$$LFDs = PS - CT \quad (2)$$

PS and CT can be obtained as follows from equation (1) and (2):

$$CT = \frac{LFDw - LFDs}{2} \quad (3)$$

$$PS = \frac{LFDw + LFDs}{2} \quad (4)$$

Each relation between (1) through (4) is illustrated in FIG. 1.

Among the conicity and the ply steer described above, the conicity is believed to be a force that is generated because the tire shape is geometrically asymmetric with respect to the center of the circumferential direction of the tire, that is, a force that is generated when the tire assuming the shape of a circular truncated cone rolls. The main reason for the occurrence of this force is the position of the belt reinforcing layer inserted into the tread of the tire, and hence can be reduced by somehow improving the production procedures. In contrast, the ply steer is a force that is inherent to the structure of the belt reinforcing layer, and can not be drastically reduced in practice unless the structure itself of this belt reinforcing layer is changed.

Let's consider the belt reinforcing layer. The belt reinforcing layer can be expressed as a two-layered laminate sheet 50 consisting of belt reinforcing layers 50u and 50d, as depicted in FIG. 2(A). It is well known in the art that when a tensile force is caused to act upon this two-layered laminate sheet 50 in the tire circumferential direction EE', the two-layered laminate sheet 50 undergoes not only deformation inside the two-dimensional plane on which the tensile force acts but also twist deformation three-dimensionally of the plane as depicted in FIG. 2(B). The ply steer described above results from this twist deformation of the belt reinforcing layer.

Various proposals have been made in the past so as to reduce the ply steer by adding a new belt reinforcing layer to the existing belt reinforcing layer, but the addition of the new belt reinforcing layer is not much desirable because it deteriorates the characterizing features of the radial tire such as its low fuel consumption, and the like.

The inventors of the present invention made intensive studies in order to eliminate the problem described above, and as a result, proposed previously a pneumatic tire (Japanese Patent Laid-Open No. 114704/1982). In the pneumatic tire of this prior patent application which is equipped with the belt reinforcing layer of the structure described above and with a carcass cord layer consisting of upper and lower two layers, the angle of reinforcing cords constituting each carcass cord layer with respect to the tire circumferential direction, when measured from the side in which the reinforcing cords of the belt reinforcing layer on the contact side with the carcass cord layer describe an acute angle with respect to the tire circumferential direction, is such that the mean value $\frac{1}{2}(\alpha_1 + \alpha_2)$ of the angle $\alpha_2$ of the reinforcing cords of the carcass cord on the contact side with the belt reinforcing layer and the angle $\alpha_1$ of the reinforcing cords of the carcass cord below the former is from 96° to 108° and their difference $(\alpha_2 - \alpha_1)$ is from 10° to 40°. According to this arrangement, the ply steer can be reduced without adding afresh any belt reinforcing layer, and running stability due to the belt reinforcing layer can be improved drastically.

However, when the reinforcing cords of each carcass cord layer are arranged to cross one another at a predetermined angle in the tire circumferential direction in order to improve the running stability as described above, another problem develops in that the reinforcing cords of each carcass cord layer are cut due to compression, particularly when driving at a low internal pressure of the tire.

SUMMARY OF THE INVENTION

It is therefore an object of the present invention to provide a pneumatic tire for a passenger car which eliminates the problem described above, improves the running stability, can drastically improve the durability particularly when driving at a low internal tire pressure, and is light in weight and economical.

In a pneumatic tire of the type which consists of a pair of right and left beads, a pair of right and left side walls continuing from the beads, respectively, and a tread interposed between the side walls, and in which a carcass cord layer is spread between the beads, and at least two layers consisting of a belt reinforcing layer whose reinforcing cords have a cord angle of from 15° to 30° with respect to the circumferential direction of the tire and a belt reinforcing layer whose reinforcing cords have a cord angle of from 150° to 165° with respect to the circumferential direction of the tire, are laminated and disposed between the tread and the carcass cord layer, the pneumatic tire for a passenger car to accomplish the object of the invention described above has a construction in which the carcass cord layer has a two-layered laminate structure consisting of upper and lower carcass cord layers; the angle of reinforcing cords constituting each carcass cord layer with respect to the tire circumferential direction, when measured from the side in which the angle of the reinforcing cords of the belt reinforcing layer on the contact side with the carcass cord layer describes an acute angle with respect to the tire circumferential direction, is such that the mean value, $\frac{1}{2}(\alpha_1+\alpha_2)$, of the angle $\alpha_2$ of the reinforcing cords of the upper carcass layer with respect to the tire circumferential direction and the angle $\alpha_1$ of the reinforcing cords of the lower carcass layer with respect to the tire circumferential direction is from 96° to 180° and their difference $(\alpha_2-\alpha_1)$ is from 10° to 40°; the upper carcass cord layer consists of polyester while the lower carcass cord layer consists of nylon; both ends of the upper carcass cord layer are extended from the ends of the belt reinforcing layers to the bead wires of the beads while both ends of the lower carcass cord layer are turned up from inside to outside by the bead wires; and the surface creep distance x of the upper carcass cord layer from the end of the belt reinforcing layer to the end thereof and the surface creep distance l of the lower carcass cord layer from the end of the belt reinforcing layer to the upper end of the bead wire satisfy the relation $x/l = 0.2 \sim 0.9$.

DESCRIPTION OF THE PREFERRED EMBODIMENTS

Hereinafter, the construction of the present invention will be described in detail with reference to one embodiment thereof shown in the accompanying drawings.

Figure 1:
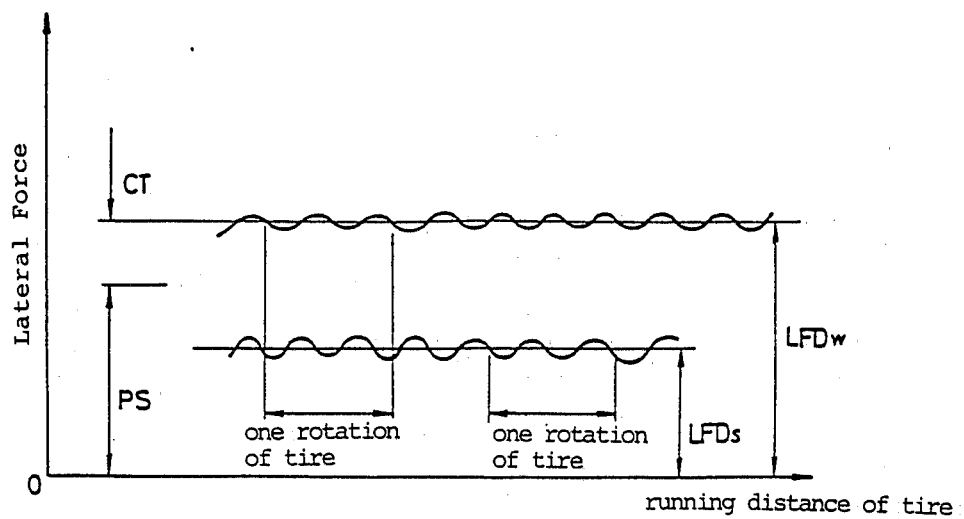
FIG. 1 is a diagram showing the relation between the driving distance and the lateral force of a radial tire.
Figure 2:
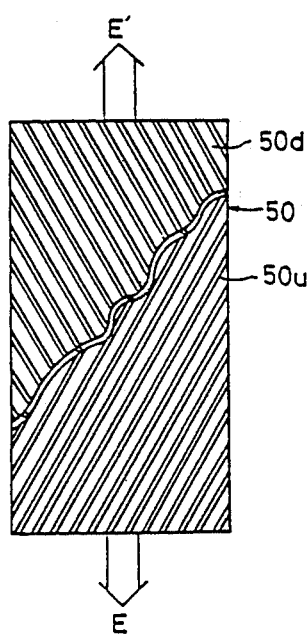
FIGS. 2(A) and 2(B) are model views showing the state of deformation of a belt reinforcing layer.
Figure 2:
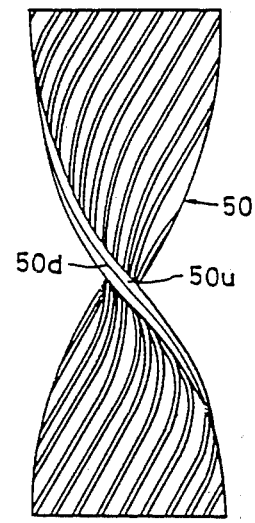
Figure 3:
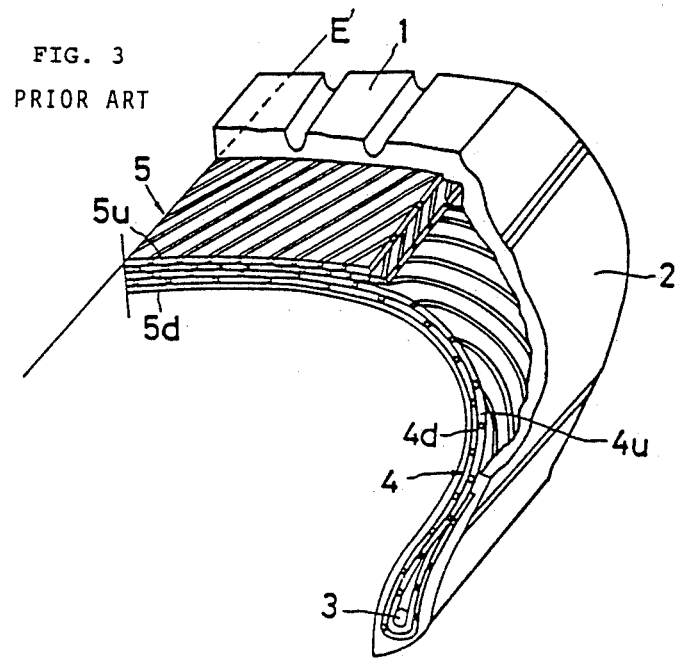
FIG. 3 is a semi-sectional perspective view showing an example of the conventional pneumatic tire.

FIG. 3 is a semi-sectional perspective view of a pneumatic tire in accordance with the prior art. In the drawing, reference numeral 1 represents a tread and reference numeral 2 represents side walls that extend from both sides of the tread 1. Reference numeral 3 represents bead wires embedded into the lower end portions of the side walls along the circumferential direction. A carcass cord layer 4 is disposed in such a manner as to wrap the bead wires 3 at both end portions and to extend along the inner surfaces of the side walls and the inner surface of the tread 1. A belt reinforcing layer 5 having steel cords is interposed between the carcass cord layer 4 and the tread 1. The carcass cord layer 4 has a two-layered laminate structure consisting of an upper carcass cord layer 4u and a lower carcass cord layer 4d, and the belt reinforcing layer 5 has also a two-layered laminate structure consisting of an upper belt reinforcing layer 5u and a lower belt reinforcing layer 5d.

Among the two layers that constitute the belt reinforcing layer 5, the cord angle of the reinforcing cords of the upper belt reinforcing layer 5u is from 150° to 165° with respect to the tire circumferential direction EE', and the cord angle of the reinforcing cords of the lower belt reinforcing layer 5d is from 15° to 30° with respect to the tire circumferential direction. The reinforcing cords of the upper and lower belt reinforcing layers 5u, 5d cross one another.

Figure 4:
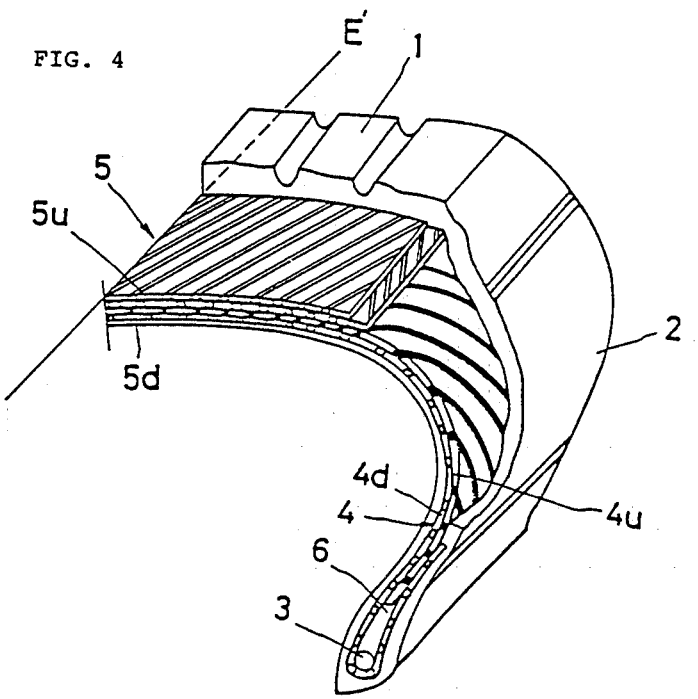
FIGS. 4 and 5 are semi-sectional perspective views showing an example of the pneumatic tire in accordance with the present invention.
Figure 5:
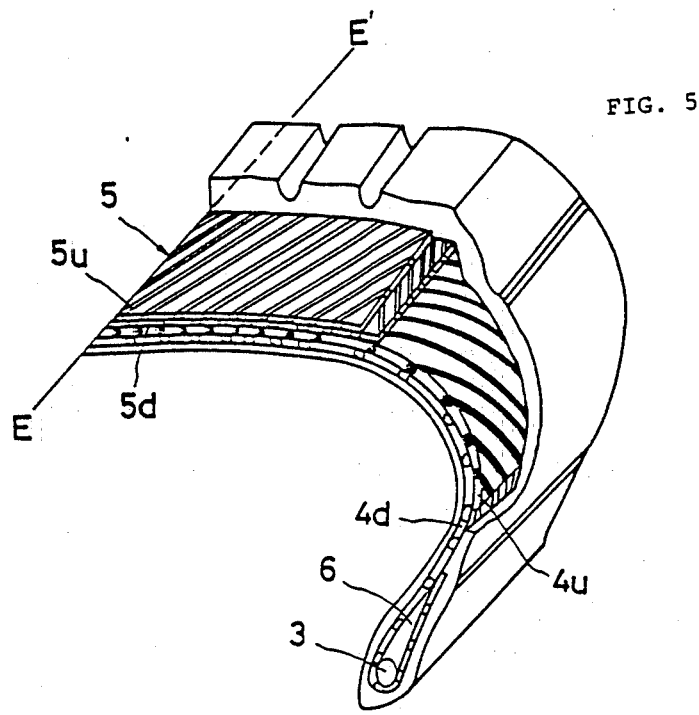
Figure 6:
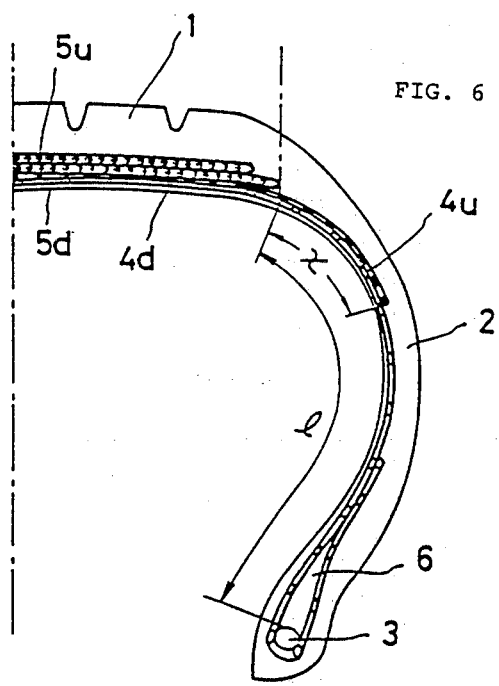
FIG. 6 is a transverse sectional schematic view showing the right half of an example of the pneumatic tire of the present invention.
Figure 7:
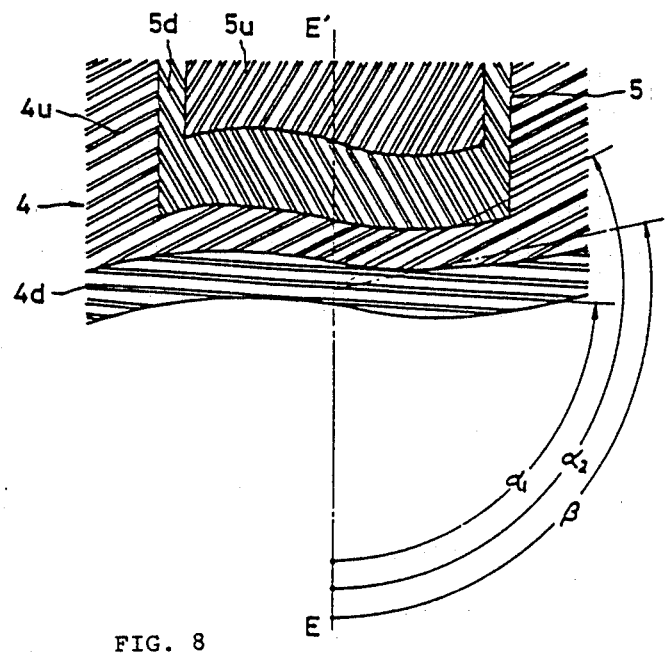
FIG. 7 is an exploded plan view of the belt reinforcing layer and carcass cord layer of the tire shown in FIG. 6.
Figure 8:
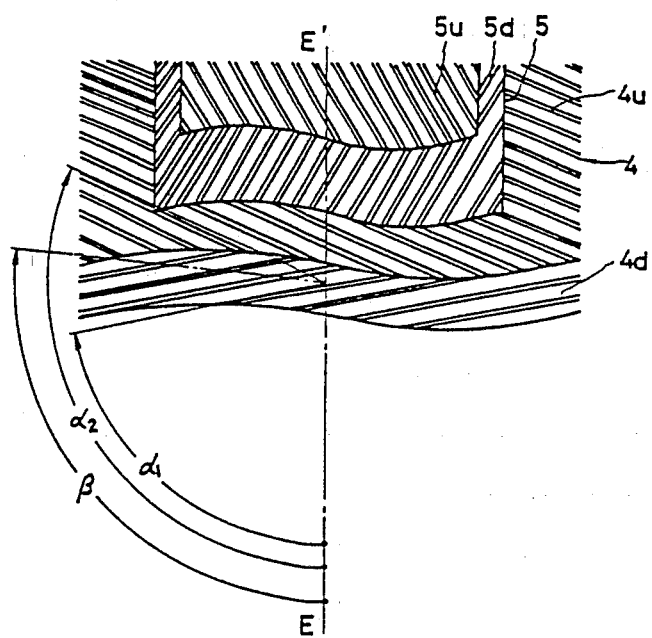
FIG. 8 is also an exploded plan view of another example of the pneumatic tire of the present invention.

In the pneumatic tire such as shown in FIG. 3, the present invention particularly stipulates the carcass cord layer. This embodiment will be described with reference to FIGS. 4 through 8. FIGS. 4 and 5 are semi-sectional perspective views of the pneumatic tire in accordance with the present invention, FIG. 6 is a transverse sectional view of the right half of the pneumatic tire, and FIGS. 7 and 8 are exploded plan views of the belt layers and carcass cord layers of the pneumatic tire.

(1) The cord angle of the reinforcing cords constituting the carcass cord layer 4 with respect to the tire circumferential direction is one of the important factors to reduce the ply steer. Therefore, the cords must be arranged so as to satisfy the following condition.

The cord angles of the reinforcing cords of the upper and lower carcass cord layers 4u, 4d forming the carcass cord layer 4 with respect to the tire circumferential direction are measured from the side in which the reinforcing cords of the lower belt reinforcing layer 5d on the contact side with the carcass cord layer 4 describes an acute angle with respect to the tire circumferential direction. The mean value $\beta = \frac{1}{2}(\alpha_1+\alpha_2)$ of the angle $\alpha_1$ of the reinforcing cords of the lower carcass cord layer 4d and the angle $\alpha_2$ of the reinforcing cords of the upper carcass layer 4u must be from 96° to 108°, while their difference $(\alpha_2-\alpha_1)$ must be from 10° to 40°. Since these angles $\alpha_1$ and $\alpha_2$ are measured from the side in which the reinforcing cords of the lower belt reinforcing layer 5d on the contact side with the carcass cord layer 4 describe an acute angle with respect to the tire circumferential direction EE', they must be measured clockwise in the rotating direction with respect to the tire circumferential direction EE', if the reinforcing cords of the lower belt reinforcing layer 5d are arranged leftwardly downward as shown in FIG. 8.

As is obvious from the relation of the angles $\alpha_1$ and $\alpha_2$ described above, the reinforcing cords of the upper carcass cord layer 4u must be disposed so that their cord angle $\alpha_2$ is greater than that $\alpha_1$ of the reinforcing cords of the lower carcass cord layer 4d and moreover, they cross one another. Since the mean value $\beta$ of these angles $\alpha_1$ and $\alpha_2$ is from 96° to 108°, the ply steer that results from the twist deformation of the belt reinforcing layer 5 can be reduced without adding afresh any belt reinforcing layer, the running stability of the tire can be improved. The handling and stability is enhanced.

If $\beta$ is below 96°, the ply steer can not be much improved when compared with that of the conventional radial tire, and if it is above 108°, the ply steer can be further improved, it is true, but driving comfortability drops to a level lower than that of the conventional radial tire. Even if the mean value $\beta$ is within the range of from 96° to 108°, however, the difference $(\alpha_2 - \alpha_1)$ must be from 10° to 40°. If the difference $(\alpha_2 - \alpha_1)$ is from 10° to 40°, the rigidity at the carcass portion can be improved in comparison with a so-called radial tire in which two-layered carcass cord layers are disposed parallel in the tire sectional direction, and higher handling and higher stability can be enjoyed. If the difference $(\alpha_2 - \alpha_1)$ is below 10°, the carcass rigidity becomes insufficient and the handling and stability drops undesirably. If the difference $(\alpha_2 - \alpha_1)$ is above 40°, the durability in heavy load running drops, although the ply steer can be improved.

(2) The upper carcass cord layer 4u is made of polyester, while the lower carcass cord layer 4d is made of nylon. If these materials are used respectively, the ply steer can be reduced drastically and durability in high speed running can be improved remarkably. If the carcass cord layers are made of synthetic fibers other than polyester and nylon, the balance of the heat shrinkage ratios between the lower and upper carcass cord layers drops and the effects described above can not be much observed.

(3) Both ends of the upper carcass cord layer 4u are positioned between the ends of the belt reinforcing layer 5 (at the end of 5d in FIG. 6) and the bead wires 3 of the beads, while both ends of the lower carcass cord layer 4d are turned up from inside to outside by the bead wires.

The arrangement described above is employed for the following reason. The respective carcass cord layers are made of polyester and nylon as described in the item (2) above, and when the carcass angle before vulcanization and after vulcanization is measured so as to compare the change, it is confirmed that the change quantity of the upper carcass cord layer is greater by about 5° to about 10° than that of the lower one 4d. This means that a greater tensile force acts upon the carcass cord of the upper carcass cord layer than upon that of the lower carcass cord layer. If polyester is used for the upper layer and nylon is used for the lower layer, the nylon cord is apt to break along the polyester cord and can not withstand the practical use particularly when the internal tire pressure is low or when an excessive load is applied to the tire, because the modulus of polyester is higher than that of nylon. The carcass cord layers 4u and 4d are disposed as described above in order to control the difference of this tensile force. This arrangement makes it possible to provide a light-weight and economical pneumatic tire.

(4) The surface creep distance x of the upper carcass cord layer 4u from the end of the belt reinforcing layer 5 (at the end of 5d in FIG. 6) to the end of the upper carcass cord layer 4u must be set so as to satisfy the relation $x/l = 0.2 \sim 0.9$ with respect to the surface creep distance l of the lower carcass cord layer 4d from the end of the belt reinforcing layer 5 to the upper end of the bead wire 3.

If this ratio $x/l$ is below 0.2, reduction of the ply steer and improvement in durability in high speed running can not be accomplished sufficiently. If $x/l$ is about 0.9, however, not only the reduction of the tire weight becomes insufficient but also various problems such as vulcanization trouble and difficulty in tire molding occur because the end of the upper carcass cord layer 4u is too close to the bead wire 3.

In the embodiment described above, the belt reinforcing layer 5 has a two-layered laminate structure made of the steel cords. However, various other belt reinforcing layers can also be used in the present invention. For example, a two-layered laminate structure consisting of a belt reinforcing layer of steel cords and a belt reinforcing layer of aromatic polyamide fibers called "KEVLAR" in the trade name, a two-layered laminate structure consisting of two textile belt reinforcing layers, and so forth, can be used. The end portions of the belt reinforcing layers may be naturally bent inwards. The present invention can also be applied to such a type of a two-layered laminate belt reinforcing layer to which an additional belt reinforcing layer of textile cords is added, whenever necessary.

Next, the present invention will be described in further detail with the following definite experimental example thereof.

EXPERIMENTAL EXAMPLE

Figure 9:
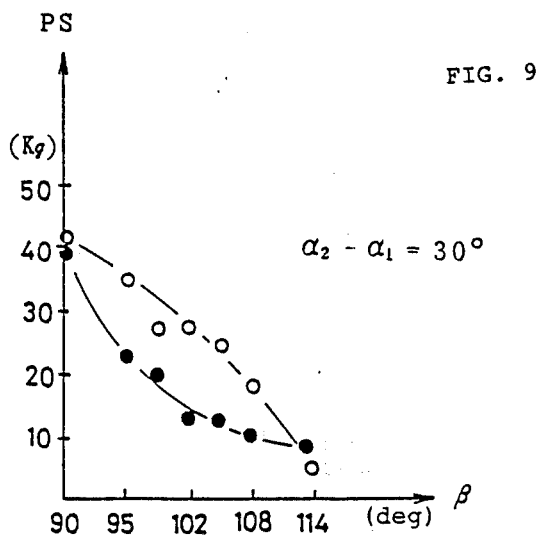
FIG. 9 is a diagram showing the relation between the ply steer and a mean angle value $\beta$.

In a pneumatic tire having the structural form of the invention shown in FIG. 4, various pneumatic tires were produced by keeping the difference of the cord angles $(\alpha_2 - \alpha_1)$ of the upper and lower carcass cord layers constant at 30°, but changing variously the mean angle value $\beta$ within the range of from 90° to 114°. The cord angles of the upper and lower belt reinforcing layers with respect to the tire circumferential direction were 20° and 160°, respectively. The tire size was 195/70HR14 and the rim was 5½—JJ×14. The ply steer of these pneumatic tires was measured in accordance with the uniformity test method JASO C607 for a passenger car, with the results shown in FIG. 9. In FIG. 9, symbol ○ represents the result of the conventional pneumatic tire (Japanese Patent Laid-Open No. 114704/1982) and symbol ● represents the results of the pneumatic tires of the present invention.

Figure 10:
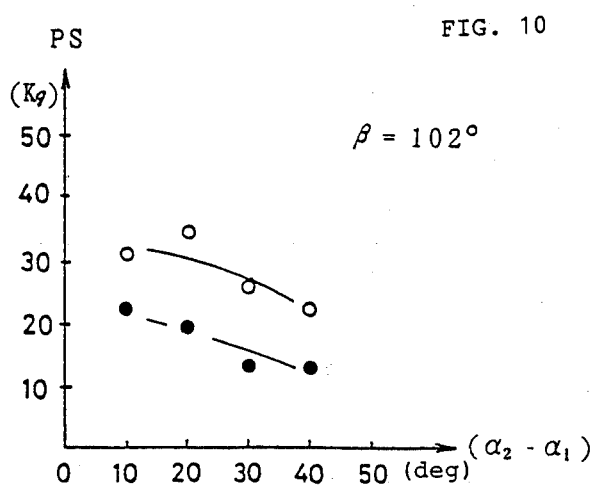
FIG. 10 is a diagram showing the relation between the ply steer and an angle difference $(\alpha_2-\alpha_1)$.

Similarly, FIG. 10 illustrates the results of an experiment in which the mean value $\beta$ of the cord angles of the upper and lower carcass cord layers was kept constant at 102° but the difference $(\alpha_2 - \alpha_1)$ of these cord angles were changed variously within the range of from 10° to 40°. Symbols ○ and ● have the same meaning as described above.

Next, a durability in high speed running test was conducted for each of the tires used in the experiments shown in FIGS. 9 and 10 using an indoor drum tester consisting of a drum of a 1707 mm diameter. Each pneumatic tire was placed under the condition of an air pressure of 2.1 kg/cm$^2$, a load of 550 kg and an initial speed of 81 km/hr. The speed was increased by 8 kg/hr every 30 minutes and was caused to run until it was broken. The speed at that time was compared with the speed of the conventional tire (Japanese Patent Laid-Open No. 114704/1982) which was indexed as 100%. The result was plotted in terms of percentage as shown in FIG. 11.

Figure 11:
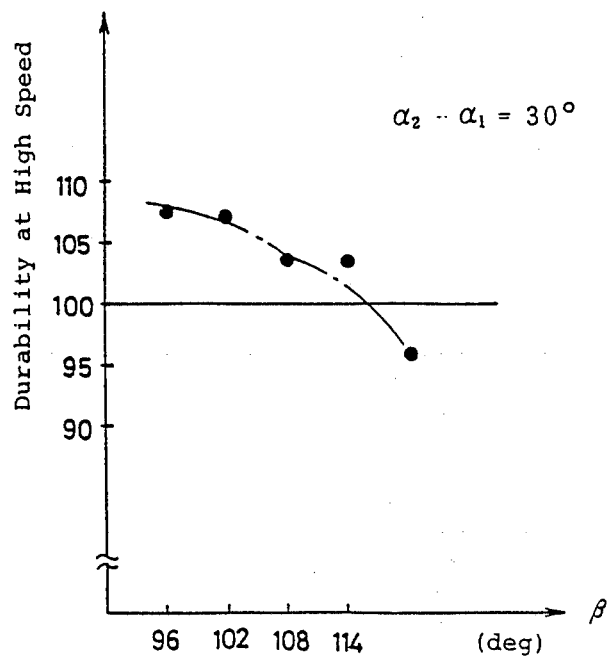
FIG. 11 is a diagram showing the relation between durability in high speed running and the mean angle value $\beta$.

It can be understood clearly from FIGS. 9 through 11 that the pneumatic tire in accordance with the present invention was found superior to the conventional pneumatic tire in the aspects of running stability and durability in high speed running.

As described above, the present invention reduces the ply steer resulting from the belt reinforcing layer in comparison with the conventional pneumatic tire, and improves running stability and driving comfortability. Moreover, the present invention improves also the handling and stability as well as durability in high speed running in comparison with the conventional pneumatic tire. Furthermore, the present invention can provides a light-weight economical pneumatic tire.

What is claimed is:

1. In a pneumatic tire comprising a tread, side walls extending from both sides of said tread and containing bead wires, a carcass cord layer and at least two belt reinforcing layers disposed between said tread and said carcass cord layer, reinforcing cord of one of said belt reinforcing layers having an angle of 15 to 30 degrees with respect to tire circumferential direction and reinforcing cord of said other belt reinforcing layer having an angle of 150 to 165 degrees with respect to tire circumferential direction and said carcass cord layer comprising a laminate of upper and lower carcass cord layers and the average value $\frac{1}{2}(\alpha_1+\alpha_2)$ of the angle $\alpha_2$ of reinforcing cord of said upper carcass cord layer adjacent said belt reinforcing layers with respect to tire circumferential direction and the angle $\alpha_1$ of reinforcing cord of said lower carcass cord layer with respect to tire circumferential direction is from 96 to 108 degrees and their difference $(\alpha_2-\alpha_1)$ is from 10 to 40 degrees when measured from the side in which the angle of the reinforcing cords of said belt reinforcing layer adjacent said carcass cord layer describes an acute angle with respect to the tire circumferential direction; the improvement comprising said upper carcass cord layer comprising polyester and said lower carcass cord layer comprising nylon with both ends of said upper carcass cord layer extending from both ends of said belt reinforcing layer toward said bead wires but not being turned up around said bead wires and both ends of said lower carcass cord layer being turned up from inside to outside around said bead wires and surface creep distance x of said upper carcass cord layer from the end of said belt reinforcing layer to the end thereof and the surface creep distance l of said lower carcass cord layer from the end of said belt reinforcing layer to the upper end of said bead wire satisfy the relation $x/l=0.2\sim0.9$.

2. The tire of claim 1 wherein said belt reinforcing layers are a two-layered laminate structure having steel cords.

3. The tire of claim 1 wherein said belt reinforcing layers comprise a layer having steel cords and a layer having aromatic polyamide fibers.

4. The tire of claim 1 wherein said end portions of said belt reinforcing layers are bent inwardly.

* * * * *